United States Patent
Reasoner et al.

(10) Patent No.: US 9,269,390 B2
(45) Date of Patent: Feb. 23, 2016

(54) EFFICIENT ERROR REPORTING FROM AN OPERATOR CONTROL PANEL OF A STORAGE APPARATUS

(75) Inventors: Kelly J. Reasoner, Fort Collins, CO (US); Curtis C. Ballard, Eaton, CO (US); Mike P. Fleischmann, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 931 days.

(21) Appl. No.: 11/259,222

(22) Filed: Oct. 26, 2005

(65) Prior Publication Data
US 2007/0094448 A1 Apr. 26, 2007

(51) Int. Cl.
G06F 11/00 (2006.01)
G11B 15/68 (2006.01)
G11B 27/34 (2006.01)
G11B 27/36 (2006.01)
G06F 11/14 (2006.01)

(52) U.S. Cl.
CPC .............. *G11B 15/68* (2013.01); *G11B 27/34* (2013.01); *G11B 27/36* (2013.01); *G06F 11/1446* (2013.01); *G11B 2220/41* (2013.01); *G11B 2220/90* (2013.01)

(58) Field of Classification Search
CPC .............. G06F 11/0748; G06F 11/327; G06F 11/0709; G06F 11/0769; G06F 11/0793
IPC ................................................... G06F 11/0748
See application file for complete search history.

(56) References Cited

U.S. PATENT DOCUMENTS

| | | | | |
|---|---|---|---|---|
| 5,214,768 A | * | 5/1993 | Martin et al. | 711/114 |
| 5,303,214 A | | 4/1994 | Kulakowski et al. | |
| 5,412,791 A | * | 5/1995 | Martin et al. | 711/114 |
| 5,438,674 A | * | 8/1995 | Keele et al. | 711/4 |
| 5,740,354 A | * | 4/1998 | Ben-Natan et al. | 714/45 |
| 5,894,376 A | * | 4/1999 | Rinard | G11B 15/686 360/130.23 |
| 6,006,308 A | * | 12/1999 | Matsunami et al. | 711/114 |
| 6,026,063 A | | 2/2000 | Ohba et al. | |
| 6,236,626 B1 | * | 5/2001 | Nagai | 360/92.1 |
| 6,487,474 B1 | * | 11/2002 | Goodman et al. | 700/245 |
| 6,832,287 B2 | | 12/2004 | Beeston et al. | |
| 7,116,506 B1 | * | 10/2006 | Mojica | 360/71 |
| 2003/0065882 A1 | | 4/2003 | Beeston et al. | |
| 2004/0254647 A1 | | 12/2004 | Johnson et al. | |
| 2008/0235476 A1 | * | 9/2008 | Goodman et al. | 711/163 |

OTHER PUBLICATIONS http://pvmehta.com/new/TSM-Concept.pdf, IBM Tivoli Storage Management Concepts 2003.*
IBM System Storage ST3500 Tape Library With Alms Operator Guide.*
Tivoli Storage Management Concepts.*
Storagetek, L700 Tape Library Operator's Guide, Nov. 1999, Storagetek, Fourth Edition, All Pages.*
Spectra Logic, Spectra 10000 Library User Guide, 2002.*
Spectra Logic, Spectra 5000.*

* cited by examiner

*Primary Examiner* — Amine Riad
(74) *Attorney, Agent, or Firm* — Law Office of Kenneth Float

(57) ABSTRACT

Storage apparatus and related methods for managing removable media. A controller is configured to manage the removable media. A user interface is coupled to the controller for displaying errors. When an error displayed on the user interface is selected, the controller causes the user interface to display additional information related to the error from an event log. For example, when the error is selected, a complete error log for an individual error or a screen display showing all current errors, if there are multiple ones, is displayed.

15 Claims, 4 Drawing Sheets

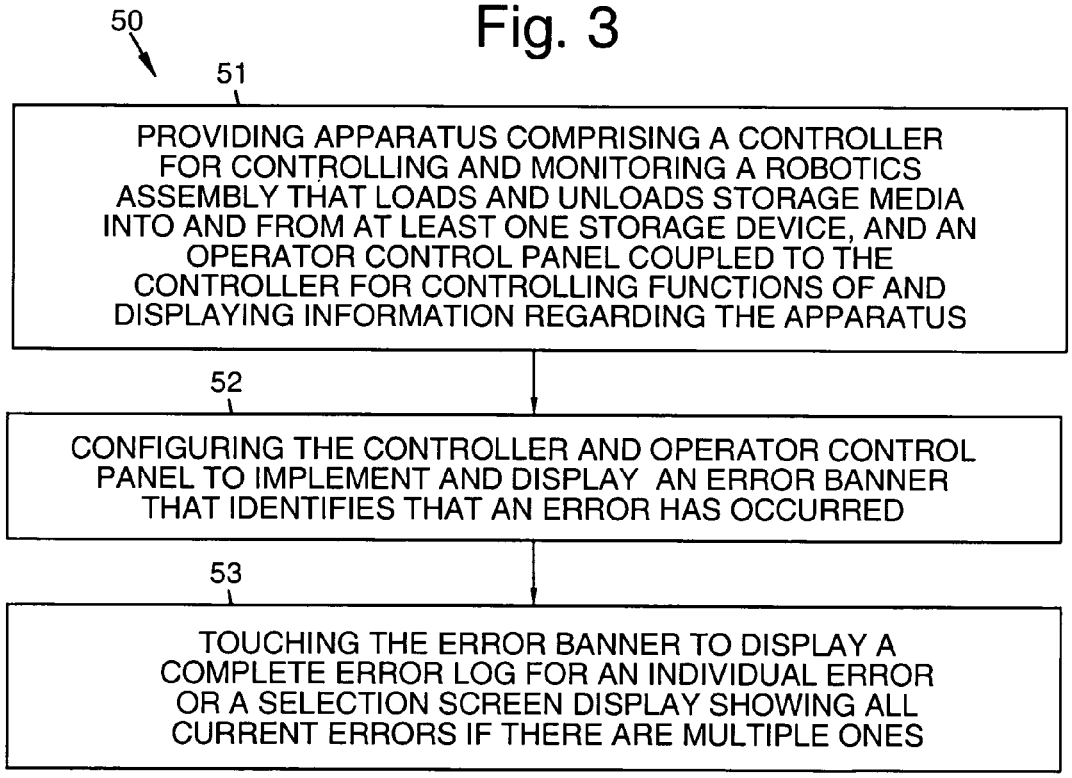

US 9,269,390 B2

EFFICIENT ERROR REPORTING FROM AN OPERATOR CONTROL PANEL OF A STORAGE APPARATUS

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a StorageWorks brand of tape libraries are manufactured in various sizes and configurations. The number of tape cartridges that can be loaded into such tape libraries varies depending upon model, but may be on the order of 400-500 tapes, for example.

A typical tape library usually has a control and display panel where local functions are controlled and where the health of the tape library may be displayed. The display typically presents information about components in the tape library that are built by the original library manufacturer. However, additional value added components may be installed in the tape library including software tools to aid in the configuration, installation, and management of the tape library. Heretofore, there has been no way to present information about the value added components to a user who is working at the library by way of the control and display panel.

When an error occurs in a product, it would be beneficial for a user to be notified of the error and then quickly be routed to where further information about the error can be found. The problem is that it is generally difficult for a user to easily navigate to a place where information about an error is located. In a complex menu structure, or in a system where errors may be stored in a multiplicity of locations, this can be very difficult and frustrating. The user may resort to calling for support rather than solving the issue themselves using information available in error logs. It can be costly for the product provider to provide this service.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 3 is a flow diagram that illustrates an exemplary method or algorithm.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other storage devices and systems, including optical drives and hard disk drives, for example.

Figure 1:
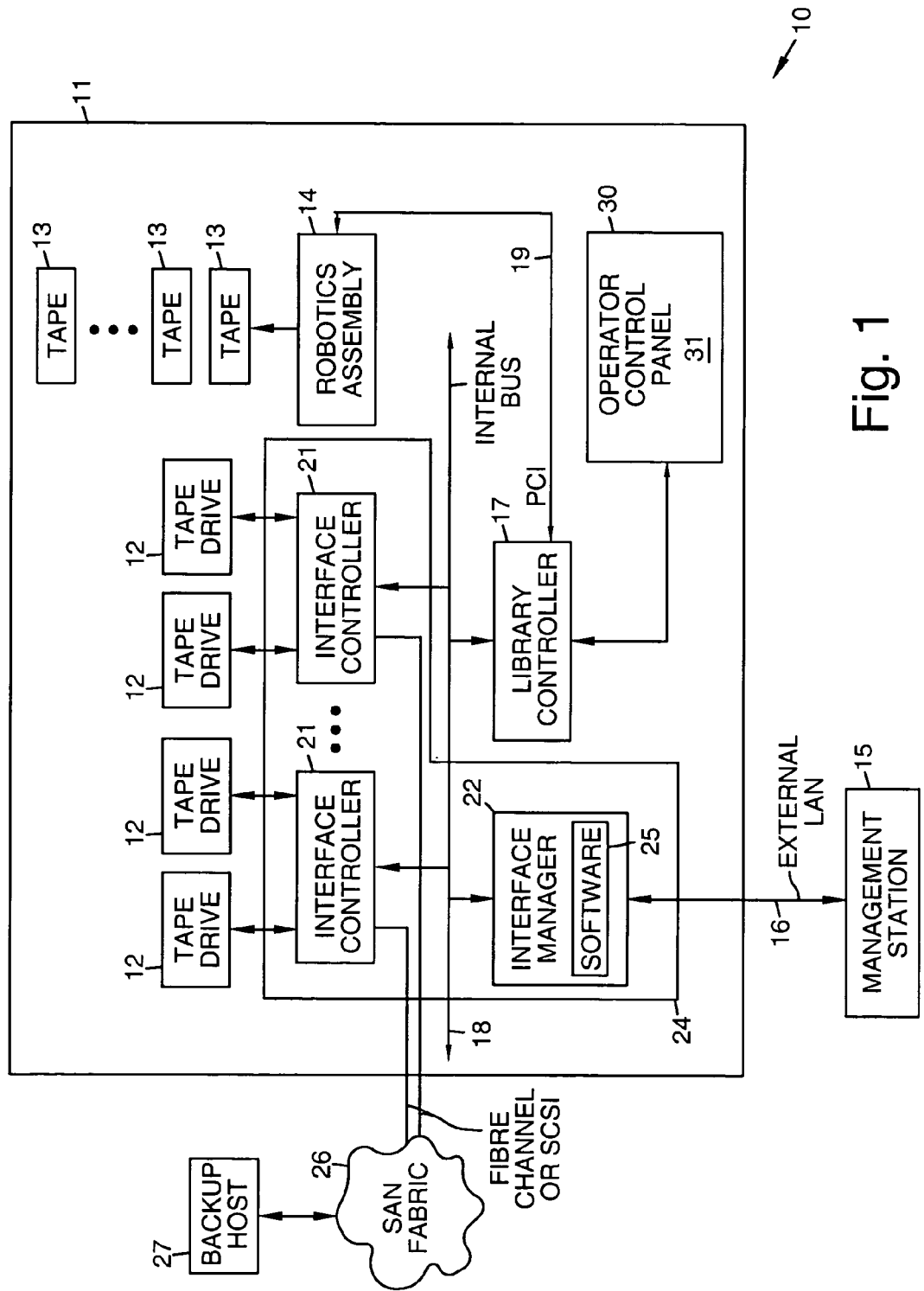
FIG. 1 is a block diagram that illustrates exemplary backup storage apparatus.

Referring to the drawing figures, FIG. 1 shows exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage device 12 might comprise an optical disk reader used with optical disk media, or removable hard disk drives, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal bus 18 comprising a communication link 18.

One or more interface controllers 21 may be coupled between selected tape drives 12 and the internal bus 18. The interface controllers 21 provide a communication path for the interface manager 22 to talk to the tape drives 12. The interface controllers 21 also provide a controlled data path between the tape drives 12 and a backup server 27. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 26, but this is not commonly used in current-generation computers.

The interface manager 22 or management appliance 22 and the interface controllers 21 comprise the value added components 24 of the tape library 10, i.e., components that may not be manufactured and installed by the original library manufacturer.

A library controller 17 is coupled by way of the internal bus 18 (communication link 18) to the one or more interface controllers 21 and to the interface manager 22 or management appliance 22. The library controller 17 is also coupled by the way of a private internal bus such as a PCI bus 19 to the robotics assembly 14.

The tape library 10 comprises an operator control panel and display system 30, referred to as an operator control panel 30, which is preferably disposed on a front panel of the tape library 10, for ease of use. The operator control panel 30 controls local functions and displays information regarding the tape library 10. The operator control panel 30 presents information about components in the tape library 10.

The operator control panel 30 comprises a graphical user interface (GUI) 31 that displays library status information and allows a user to access the library menus. These menus allow a user to view or change the library settings, run demonstration programs, and run diagnostic tests, for example. Certain of these menus are illustrated in and are discussed with reference to FIGS. 2a-2d.

FIGS. 2a-2d show exemplary screen displays 34 that may be displayed on an embodiment of a backup storage device 10, such as a tape library 10, for example. Certain of the exemplary screen displays 34 specifically relate to an exemplary error reporting function. The exemplary screen displays 34 and error reporting function may be presented on a display screen 35 of the operator control panel 30.

The exemplary error reporting function is implemented by way of an exemplary menu 36 that is one menu of a menu structure or tree. The operator control panel 30 has a menu structure that has many paths, such as is illustrated by multiple menus 34 shown in FIGS. 2b-2d, of which the exemplary menu 36 is but one.

Figure 2A:
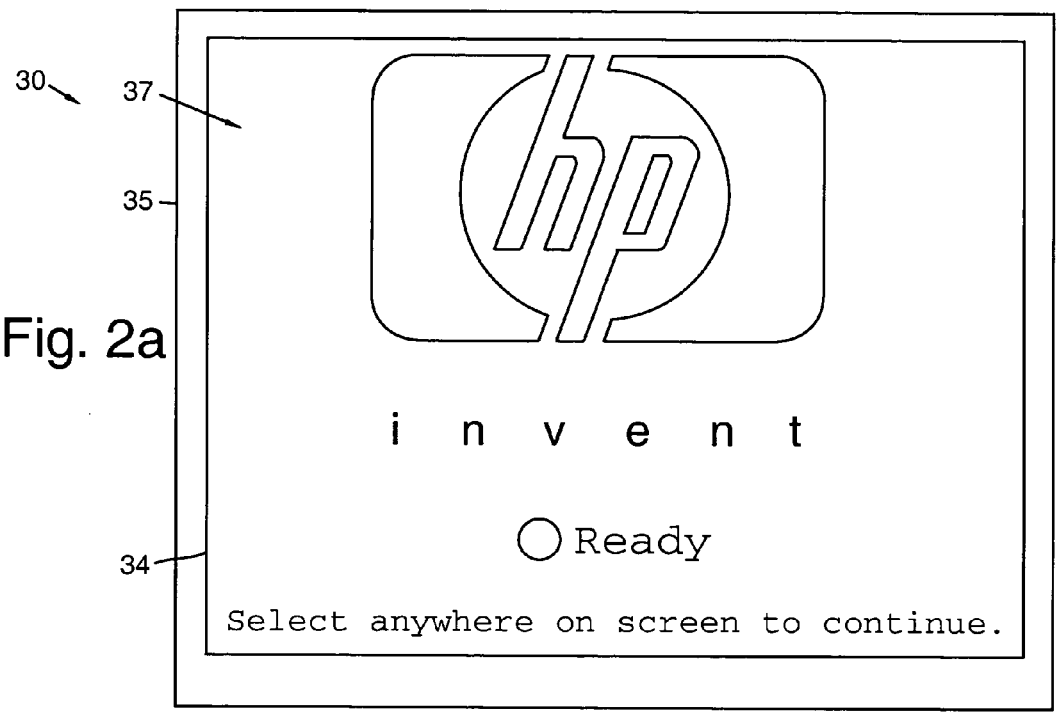
FIGS. 2a-2d illustrate exemplary display screens of an exemplary error reporting function for use in backup storage or other devices.

FIG. 2a shows an exemplary screen display 34 comprising an initial splash screen 37 showing a logo. A "Ready" icon 38 (or selectable identifier) is configured to display green, yellow and red colors, indicating that the library 10, for example, is ready for operation (green), has a minor problem (yellow) or has a major problem (red). It is to be understood that components other than the library 10 may also exhibit errors. Clicking on the screen display 34 takes the user of a subsequent screen display 34, shown in FIG. 2b.

Figure 2B:
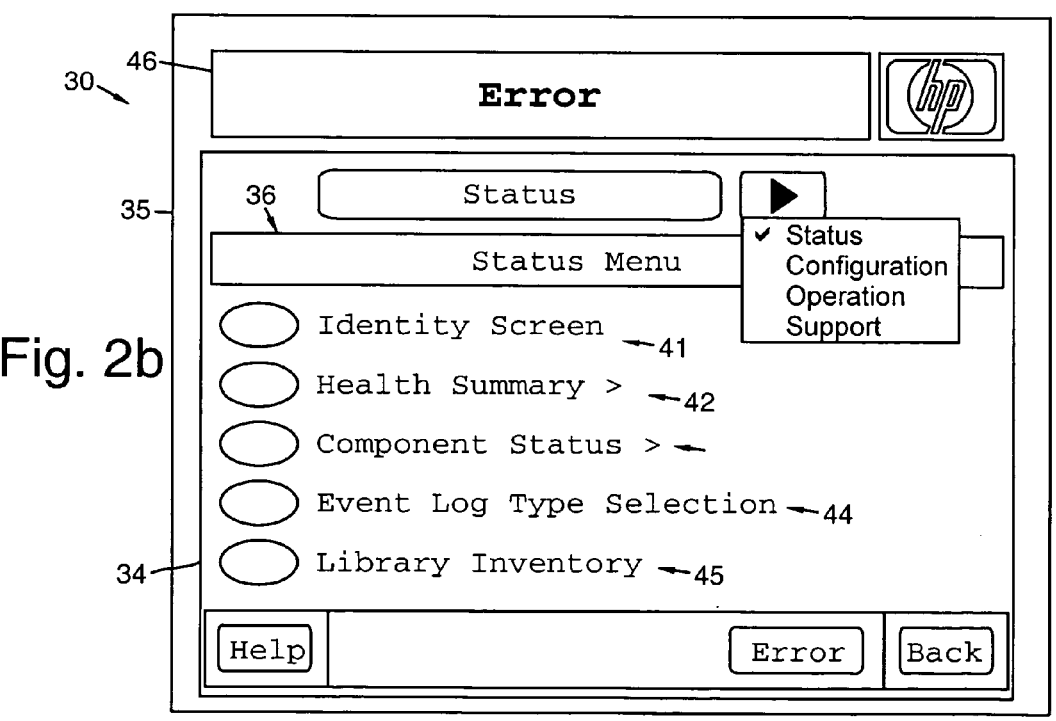

The screen display 34 shown in FIG. 2b may be used to present Status, Configuration, Operation and Support information to the user. The user may display the information contained in the Status, Configuration, Operation and Support menus by touching the appropriate selectable identifier at the top of the screen, or by touching the right pointing arrow to select one of the screens that is not yet displayed (Operation and Support screens, in this case).

In the event that an error occurs in the tape library 10, it may be indicated by a selectable error banner 46, identifier 46, or icon 46, for example, displayed at the top of FIG. 2b, for example. Touching or selecting the error banner 46 routes the user to a display screen 34 showing a complete error log or particular error, as the case may be. An error log includes specific errors. An event log may include status, warning and error information, which relate to events that may occur.

Figure 2C:
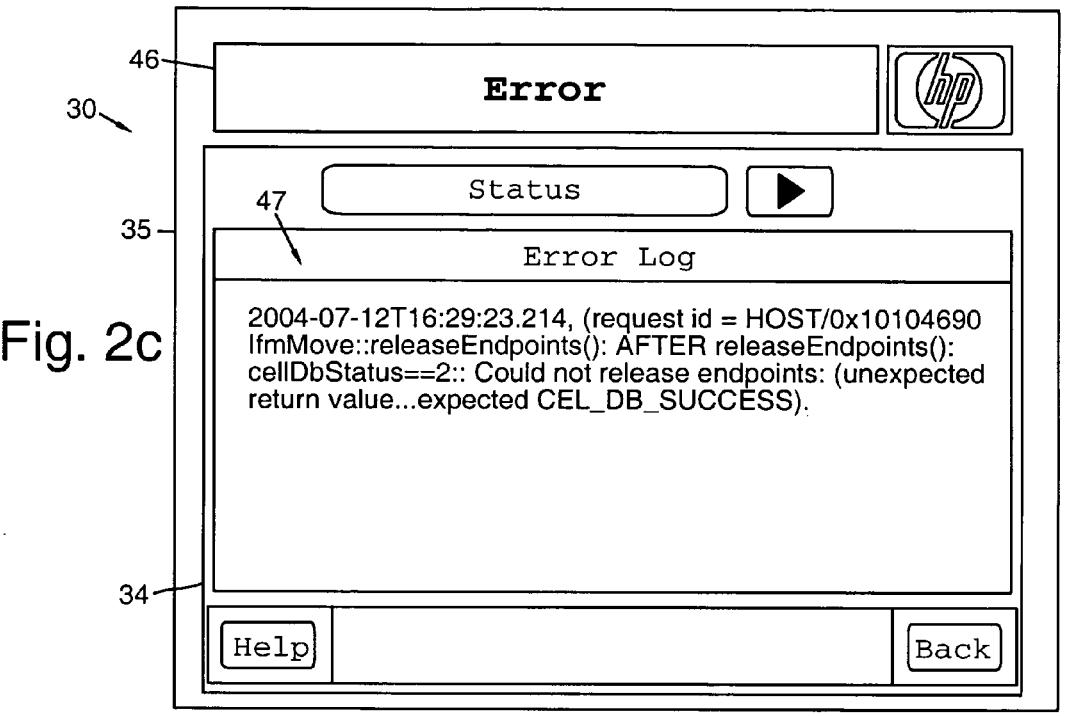
Figure 2D:
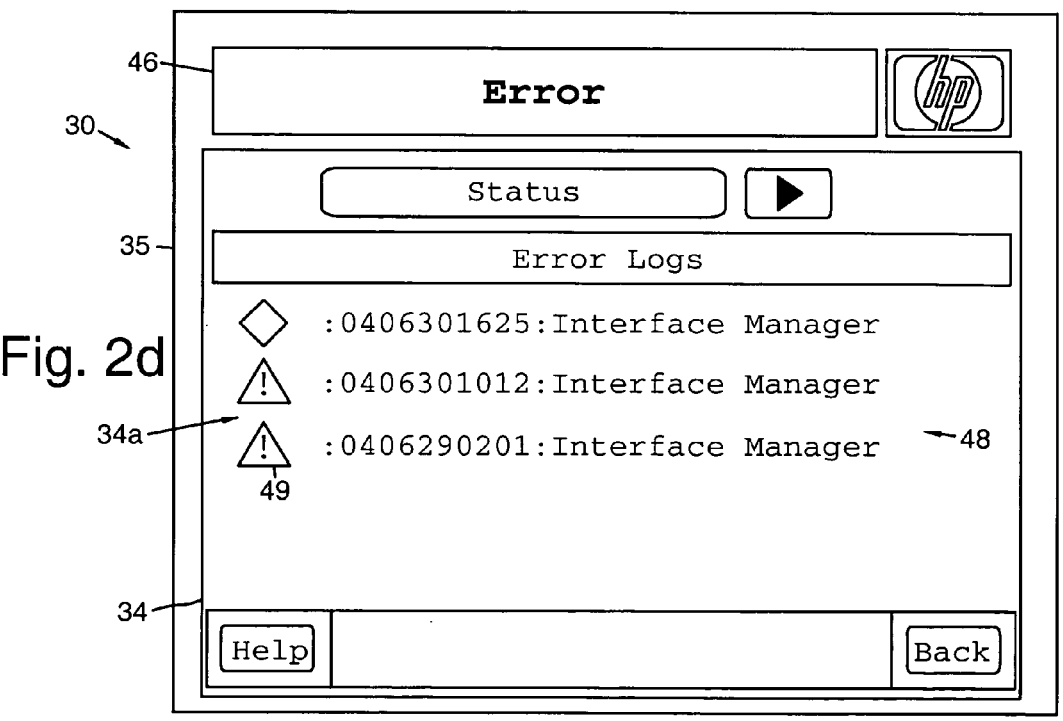

FIGS. 2c and 2d illustrate exemplary display screens 34 showing exemplary error logs that may be displayed on the operator control panel 30. The operator control panel 30 may be configured to present an error banner 46 (or selectable identifier 46) on its display screen 35 that identifies that an error or warning has occurred, such as those shown in FIG. 2b. If there are no errors or warnings, the error banner 46 displays "Ready", for example. When the error banner 46 (or selectable identifier 46) is touched or selected by a user, the user is directly routed to the complete error log 47 for an individual error (FIG. 2c) or to a selection screen display 34a (FIG. 2d) showing all current errors 48 if there are multiple ones. Alternatively, a display screen may be displayed showing the state of all components that make up the library Referring to FIG. 2c, the display screen 35 displays the error log 47 for the individual error. Referring to FIG. 2d, the selection screen display 34a shows all current errors 48. Three errors 48 are displayed relating to the interface manager 22 in the exemplary display screen. The first error has a status or warning label 49 or icon 49 (which may be yellow in color, for example) indicating that a warning is present. The second and third errors have status or warning labels 49 or icons 49 (which may be red in color, for example) indicating that a major error has occurred.

Touching the error banner 46 (or selectable identifier 46) causes the display screen 34 to display the contents of all error logs that relate to the error or errors 48 that have been encountered. The displayed error logs 47 may be read and evaluated by the user to permit correction of the problem in the backup storage apparatus 10 that caused the error 48. Having direct access to all error logs 47 relating to the problem readily allows the user to address the problem without necessitating calls to technical support personnel of the product provider. Simple reference to user or operator manuals allows the error logs 47 to be interpreted so that corrective action may be taken.

The operator control panel 30 provided on the front panel of the backup storage apparatus 10 or tape library 10 is configured to display error logs 47 relating to errors that occur during operation of the backup storage apparatus 10 without the user having to search for the error logs 47. This solution does not require the user to search through complex menu structures or multiple locations where error logs 47 are stored.

Thus, display of error logs 47 may be implemented using the operator control panel 30 and its graphical user interface 31. However, any interface 31, such as a web interface, or command line interface, for example, may be used for this purpose. Such a web interface or command line interface may communicate with the interface manager 22 to permit remote access to and display of error logs 47.

FIG. 3 is a flow diagram that illustrates an exemplary method 50 or algorithm 50 for use in backup storage apparatus 10, for example. The exemplary method 50 or algorithm 50 may be used with backup storage apparatus 10 such as magnetic tape libraries, optical drives and hard disk drives, for example, although it is described with reference to use with a tape library 10. The exemplary method 50 or algorithm 50 comprises the following actions.

A tape library 10 (storage apparatus 10) is provided 51 that comprises a controller 17 that controls and monitors a robotics assembly 14 that loads and unloads tape cartridges 13 into and from at least one tape drive 12, and an operator control panel 30 coupled to the controller 17 for controlling functions of and displaying information regarding the tape library 10.

The controller 17 and operator control panel 30 are configured 52 to implement and display an error banner 46 on its display screen 35 that identifies that an error has occurred.

When the error banner 46 is touched by a user, a complete error log 47 for an individual error is displayed 53, or a selection screen display 34a showing all current errors 48, if there are multiple ones, is displayed 53.

Thus, storage apparatus 10 and related methods 50 for managing removable media 13 have been disclosed. The controller 17 is configured to manage the removable media 13. The user interface 31 is coupled to the controller 17 for displaying errors. When an error displayed on the user interface 31 is selected, the controller 17 causes the user interface 31 to display additional information related to the error from an event log.

Thus, improved backup storage apparatus and information sharing methods or algorithms have been disclosed. It is to be understood that the above-described embodiments are merely illustrative of some of the many specific embodiments that represent applications of the principles of the present invention, an example of which is to migrate to a display screen showing the state of all components that make up the library. Clearly, numerous and other arrangements can be readily devised by those skilled in the art without departing from the scope of the invention.

What is claimed is:

1. A storage library device, comprising:
a housing;
a plurality of storage drives inside the housing;
a robotics assembly inside the housing to load and unload a removable media in a selected storage drive of the storage drives;
a controller inside the housing configured to control the robotics assembly;
components inside the housing; and
an operator panel on the housing, the operator panel to display a user interface provided by the controller for displaying errors for the components;
wherein, in response to user selection of an error displayed on the user interface, the controller is to cause the user interface to directly route a user to a complete error log for the selected error.

2. The storage library device of claim 1, wherein the user interface comprises a web interface.

3. The storage library device of claim 1, wherein the user interface comprises a command line interface.

4. The storage library device of claim 1, wherein the errors that are displayed on the user interface comprise a user-selectable error banner, and wherein when the user-selectable error banner displayed on the user interface is user selected, the controller causes the user interface to directly route the user to the complete error log.

5. The storage library device of claim 1, wherein the user interface on the operator control panel has a control element to run a diagnostic test of the storage library device.

6. The storage library device of claim 1, wherein the components include first components and additional value added components, where the first components are provided by an original manufacturer of the storage library device, and the additional value added components are provided by a manufacturer different from the original manufacturer, and wherein the user interface is to display errors of both the first components and the additional value added components.

7. The storage library device of claim 6, wherein the additional value added components include an interface manager and an interface controller, the interface manager to configure and manage the storage library device, and the interface controller to provide a communication path between a bus and the selected storage drive that is configured to receive the removable media.

8. The storage library device of claim 1, wherein the robotics assembly is to selectively load and unload plural removable media in respective storage drives of the plurality of storage drives.

9. The storage library device of claim 1, wherein the errors that are displayed on the user interface comprise an error banner, and wherein the controller is to directly route the user to the complete error log in response to the user touching the error banner on the user interface.

10. A method comprising:
providing a storage library device having a housing containing a robotics assembly and a plurality of storage drives, the robotics assembly to load and unload a removable storage media in a selected storage drive of the storage drives;
configuring a controller inside the housing to manage the robotics assembly;
providing an operator panel on the housing;
configuring the controller to display a user interface, in the operator panel, the user interface displaying errors of components in the storage library device;
displaying an error banner on the user interface in response to at least one error of at least one of the components; and
displaying content of an error log that relate to the at least one error in response to the error banner being touched without a user having to search multiple locations for the error log.

11. The method of claim 10, wherein the user interface comprises a web interface.

12. The method of claim 10, wherein the user interface comprises a command line interface.

13. The method of claim 10, further comprising providing a control element in the user interface that is user selectable to run a diagnostic test of the storage library device.

14. The method of claim 10, wherein the components include first components and an additional value added component, where the first components are provided by an original manufacturer of the storage library device, and the additional value added component is provided by a manufacturer different from the original manufacturer, wherein the user interface displays errors of both the first components and the additional value added component.

15. The method of claim 10, wherein the robotics assembly is to selectively load and unload plural removable storage media in respective storage drives of the plurality of storage drives.

* * * * *